(12) United States Patent
Chen et al.

(10) Patent No.: US 7,993,018 B2
(45) Date of Patent: Aug. 9, 2011

(54) PROJECTION OPTICAL SYSTEM AND LIGHT AMOUNT ADJUSTING COMPONENT USED IN THE SAME

(75) Inventors: Cheng-Kuei Chen, Hsin-Chu (TW); Chia-Chi Chung, Hsin-Chu (TW)

(73) Assignee: Coretronic Corporation, Hsinchu (TW)

( * ) Notice: Subject to any disclaimer, the term of this patent is extended or adjusted under 35 U.S.C. 154(b) by 213 days.

(21) Appl. No.: 12/369,343

(22) Filed: Feb. 11, 2009

(65) Prior Publication Data
US 2009/0237626 A1 Sep. 24, 2009

(30) Foreign Application Priority Data
Mar. 24, 2008 (TW) ................ 97110296 A

(51) Int. Cl.
*G03B 21/20* (2006.01)
(52) U.S. Cl. ................ 353/97; 355/53; 355/67
(58) Field of Classification Search .......... 353/97; 355/53, 67
See application file for complete search history.

(56) References Cited

U.S. PATENT DOCUMENTS

| 6,597,430 B1 * | 7/2003 | Nishi et al. ............ 355/53 |
| 7,287,864 B2 | 10/2007 | Shirasu et al. |
| 2007/0133208 A1 | 6/2007 | Smith et al. |

FOREIGN PATENT DOCUMENTS

TW I259829 8/2006

* cited by examiner

*Primary Examiner* — Seung C Sohn
(74) *Attorney, Agent, or Firm* — Muncy, Geissler, Olds & Lowe, PLLC

(57) ABSTRACT

A light amount adjusting component adapted a projection optical system is provided. The light amount adjusting component has a light incident surface upon which a light beam impinges, and the light incident surface is provided with a surface structure for irregularly dispersing the light beam. A slot that permits the light beam to pass therethrough and enter a light-receiving element is formed on the light amount adjusting component, and a width of the slot changes along an extension direction of the slot to allow control of the amount of the light beam entering the light-receiving element when the light amount adjusting component moves or rotates.

20 Claims, 6 Drawing Sheets

PROJECTION OPTICAL SYSTEM AND LIGHT AMOUNT ADJUSTING COMPONENT USED IN THE SAME

CROSS REFERENCE TO RELATED APPLICATION

This application claims priority of application No. 097110296 filed in Taiwan R.O.C on Mar. 24, 2008 under 35 U.S.C. §119; the entire contents of which are hereby incorporated by reference.

BACKGROUND OF THE INVENTION

1. Field of the Invention

The invention relates to a projection optical system having comparatively long component operating life and excellent display contrast and relates to a light amount adjusting component adapted to the projection optical system.

2. Description of the Related Art

Referring to FIG. 1, a conventional projection optical system 100 includes a light source 102, a color wheel 104, an aperture disk 106, a light integrator rod 108, a digital micromirror device 110, a condenser lens 112, a reflective mirror 114, a relay lens 116, and a projection lens 118. The aperture disk 106 is disposed between the color wheel 104 and the light integrator rod 108 and has a slot S. Referring to FIG. 2, since a width of the slot S changes monotonically along an extension direction of the slot S (the width of the slot S decreases in a clockwise direction), when the aperture disk 106 is actuated by a step motor 122 to continually rotate on its axis, an overlap area between the slot S and a light incident surface 108a of the light integrator rod 108 gradually varies to change the amount of light entering the light integrator rod 108 and the projection lens 118. Since a projected black color becomes darker as the amount of light entering the light integrator rod 108 is reduced, the control of the amount of light permits a higher ratio of a projection device's brightest white to its darkest black and thus improves its display contrast.

Typically, a conventional aperture disk 106 is made of aluminum alloy or stainless steel, and thus it has a highly polished surface. When the aperture disk 106 rotates to a position where a light-transmitting portion of the slot S relative to the light incident surface 108a is comparatively small, the aperture disk 106 blocks most of light ready to enter the light integrator rod 108. In that case, the polished aperture disk 106 is subjected to intensive illumination to cause a sharp increase in temperature and liable to be burnt out. Further, the light reflected back to the light source 102 by the polished aperture disk 106 may cause an excessive rise in lamp temperature to fail to maintain a proper range of operating temperature of the light source 102.

BRIEF SUMMARY OF THE INVENTION

The invention provides a projection optical system having comparatively long component operating life and excellent display contrast and a light amount adjusting component adapted to the projection optical system.

According to an embodiment of the invention, a projection optical system includes a light source, a light homogenizer, a light amount adjusting component, an imaging device, and a projection lens. The light source emits a light beam, and the light homogenizer is disposed on a propagation path of the light beam for homogenizing the light beam to form a homogenized beam. The light amount adjusting component is disposed on the propagation path of the light beam and between the light source and the light homogenizer. The light amount adjusting component has a light incident surface upon which the light beam impinges, and the light incident surface is provided with a surface structure for irregularly dispersing the light beam. A slot is formed on the light amount adjusting component and a width of the slot changes along an extension direction of the slot to allow control of the amount of the light beam entering the light homogenizer when the light amount adjusting component moves or rotates. The imaging device is disposed on a propagation path of the homogenized beam for modulating the homogenized beam to form an image beam, and a projection lens receives and then projects the image beam.

In one embodiment, the light amount adjusting component includes an aperture disk, the light homogenizer includes a light integrator rod, and a shape of the slot is defined by an outer spiral and an inner spiral. When the light amount adjusting component moves or rotates, an overlap area between the slot and a light incident surface of the light homogenizer changes to vary the amount of light entering the projection lens.

In one embodiment, the surface structure formed on the light incident surface of the light amount adjusting component includes a sandblasted structure.

In one embodiment, the surface structure formed on the light incident surface of the light amount adjusting component includes a plurality of micromachining structures, such as notches or bumps.

According to another embodiment of the invention, a light amount adjusting component adapted to a projection optical system is provided. The light amount adjusting component has a light incident surface upon which a light beam impinges, and the light incident surface is provided with a surface structure for irregularly dispersing the light beam. A slot that permits the light beam to pass therethrough and enter a light-receiving element is formed on the light amount adjusting component, and a width of the slot changes along an extension direction of the slot to allow control of the amount of the light beam entering the light-receiving element when the light amount adjusting component moves or rotates.

According to the above embodiments, since the light incident surface of the light amount adjusting component is provided with a surface structure for irregularly dispersing the light beam, the rough surface structure makes disordered angles in relation to incoming light beams to diffuse or scatter the incoming light beams, and, as a result, the incoming light beams is dispersed to reduce the light energy absorbed by the light amount adjusting component. This effectively prevents the light amount adjusting component from being burnt out. Further, since reflected light beams are reflected by the rough surface structure at disordered angles, the amount of light reflected back to a light source is considerably reduced to avoid an excessive rise in lamp temperature of the light source.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
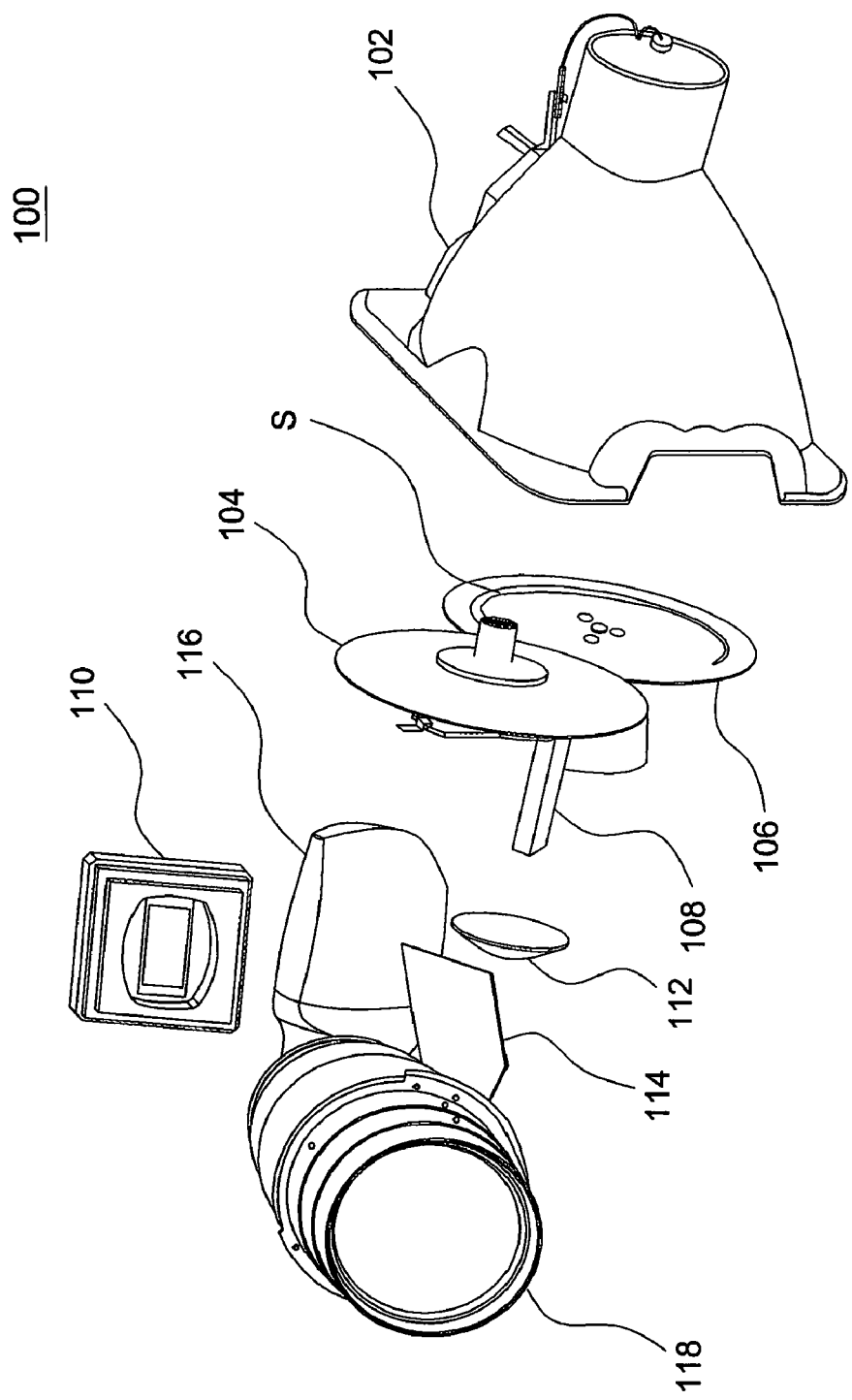
FIG. 1 shows an explosion diagram illustrating a conventional projection optical system.
Figure 2:
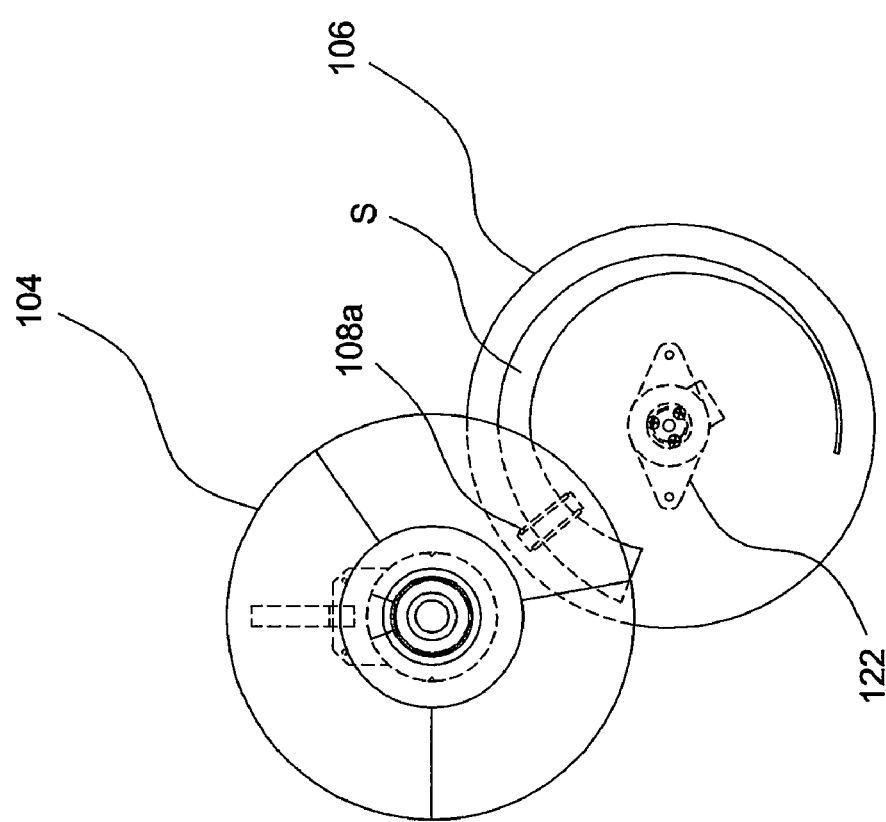
FIG. 2 shows a schematic diagram illustrating a position relationship between a slot of an aperture disk and a light integrator rod shown in FIG. 1.
Figure 3:
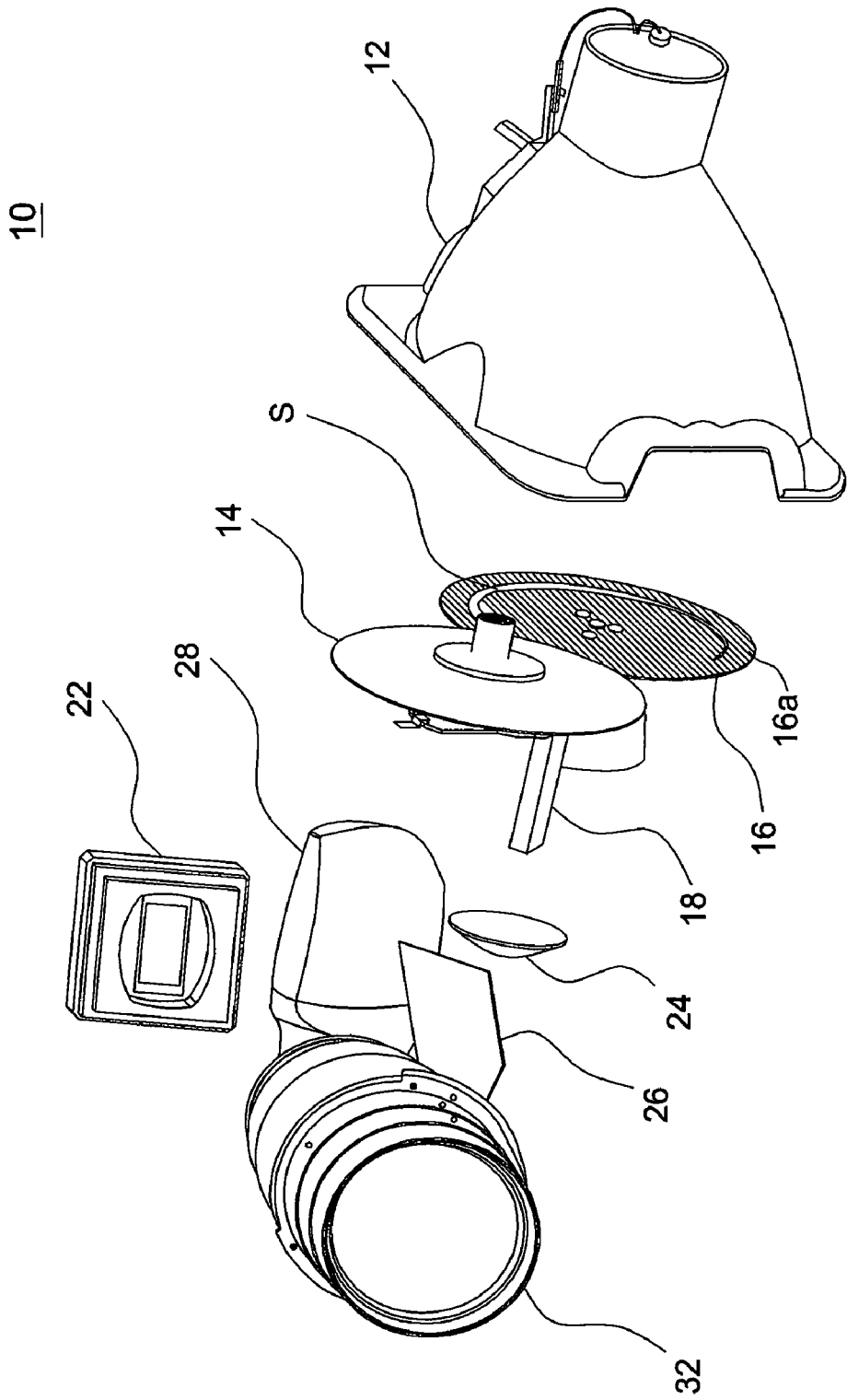
FIG. 3 shows an explosion diagram of a projection optical system according to an embodiment of the invention.

FIG. 3 shows an explosion diagram of a projection optical system 10 in accordance with an embodiment of the invention. Referring to FIG. 3, the projection optical system 10 includes a light source 12, a color wheel 14, an aperture disk 16, a light integrator rod 18, an imaging device (such as a digital micro-mirror device 22), a condenser lens 24, a reflective mirror 26, a relay lens 28, and a projection lens 32. Note though the imaging device is exemplified as a digital micro-mirror device 22 in this embodiment, it may be other reflection-type imaging device instead, such as a reflection-type liquid crystal light valve.

The light source 12 may be an arc-lamp, and its emitting light is transformed into color light beams (such as red, green and blue light beams) after passing through the color wheel 14. The color light beams pass through the aperture disk 16 and then enter the light integrator rod 18 to be homogenized. The homogenized light beams are focused by the condenser lens 24, reflected to the relay lens 28 by the reflective mirror 26, and then transmitted to the digital micro-mirror device 22 by the relay lens 28. The digital micro-mirror device 22 has multiple micro-mirrors (not shown) to modulate the homogenized light beams to form image beams, where on-state mirrors guide light beams to the projection lens 32 and off-state mirrors guide light beams away from the projection lens 32. Finally, the image beams enter the projection lens 32 and are projected on a screen (not shown) through the projection lens 32. Note the optics for generating color light beams includes, but is not limited to, the color wheel 14.

Figure 4:
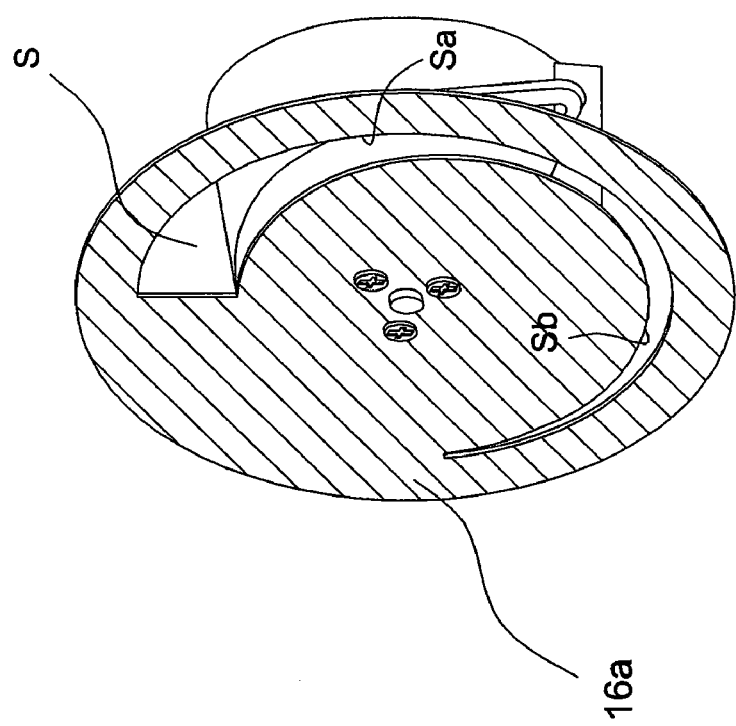
FIG. 4 shows an enlarged schematic diagram illustrating an aperture disk according to an embodiment of the invention.
Figure 5:
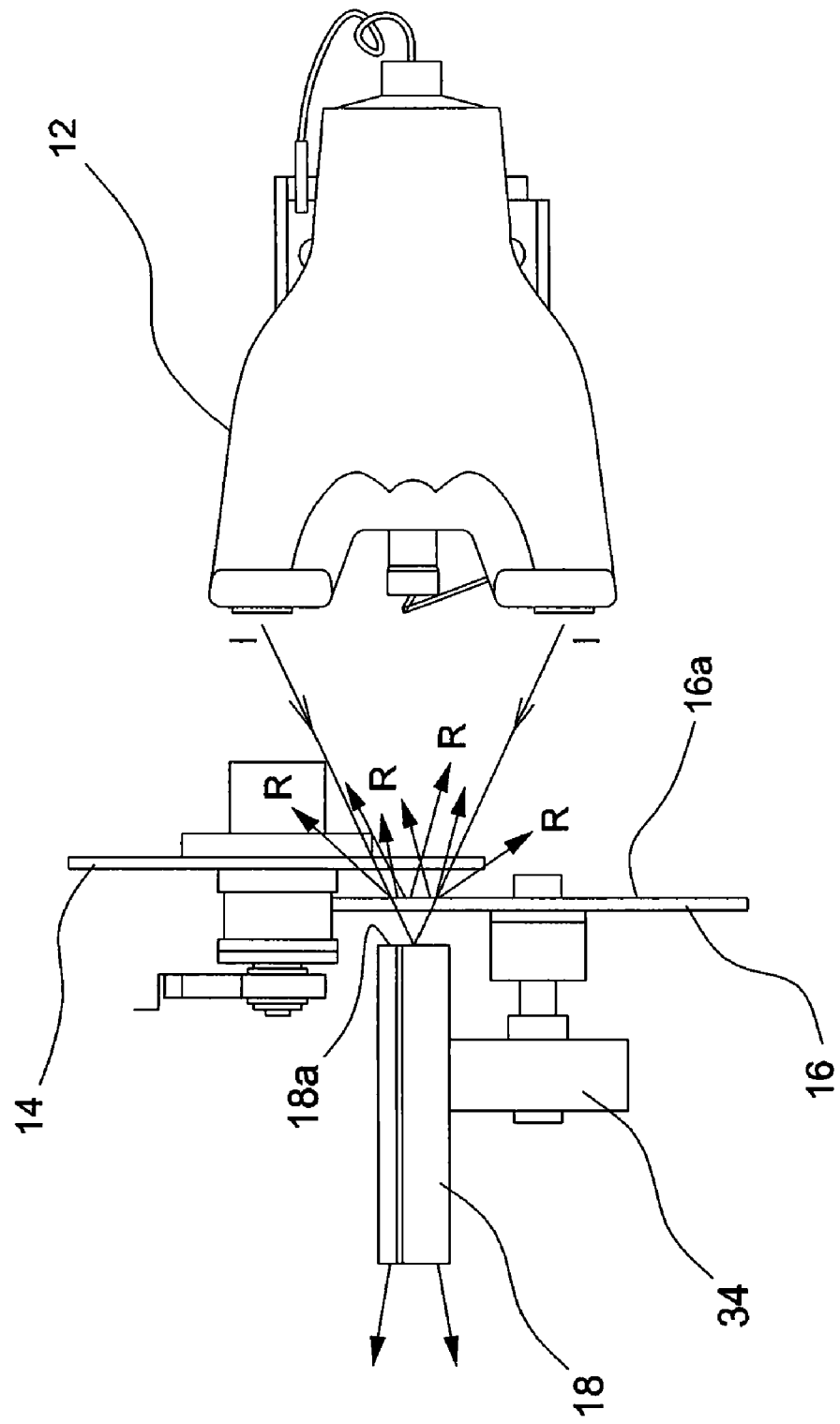
FIG. 5 shows a schematic diagram illustrating the design effect of the aperture disk shown in FIG. 4.

Referring to FIG. 4, a slot S is formed on the aperture disk 16 between the color wheel 14 and the light integrator rod 18. In one embodiment, a shape of the slot S is defined by an outer spiral Sa and an inner spiral Sb, and at least one spiral has a property that its radius changes linearly with rotation, so a width of the slot S changes monotonically along an extension direction of the slot S. For example, as shown in FIG. 4, the width of the slot S decreases in a clockwise direction. Hence, when the aperture disk 16 is actuated by a step motor 34 shown in FIG. 5 to continually rotate on its axis, an overlap area between the slot S and a light incident surface 18a of the light integrator rod 18 is varied to change the amount of the light beam I entering the light integrator rod 18 and the projection lens 32. Since a projected black color becomes darker as the amount of the light beam I entering the light integrator rod 18 is reduced, the control of the amount of light permits a higher ratio of a projection device's brightest white to its darkest black and thus improves its display contrast. In this embodiment, a light incident surface 16a of the aperture disk 16 upon which the emitting light of the light source 12 impinges is a rough surface formed through surface treatment. For example, the light incident surface 16a may be a sandblasted surface through sandblasting surface treatment. As shown in FIG. 5, in case the light incident surface 16a of the aperture disk 16 is a rough surface, its rough surface structure makes disordered angles in relation to the incoming light beams I to diffuse or scatter the incoming light beams I, and, as a result, the incoming light beams I is dispersed to reduce the light energy absorbed by the aperture disk 16. This effectively prevents the aperture disk 16 from being burnt out. Further, since reflected light beams R are reflected by the rough surface structure at disordered angles, the amount of light reflected back to the light source 12 is considerably reduced to avoid an excessive rise in lamp temperature of the light source 12. Note the slot S is not limited to the shape defined by an outer spiral Sa and an inner spiral Sb, and it may be in other shape as long as the amount of light finally entering the projection lens 32 is adjustable through the profile of the slot S. Further, a light amount adjusting component adapted to the above embodiments includes, but is not limited to, an aperture disk 16. Other component with a slot S capable of varying the overlap area between the slot S and the light integrator rod 18 through its movement or rotation may also be adapted to the above embodiments.

Figure 6:
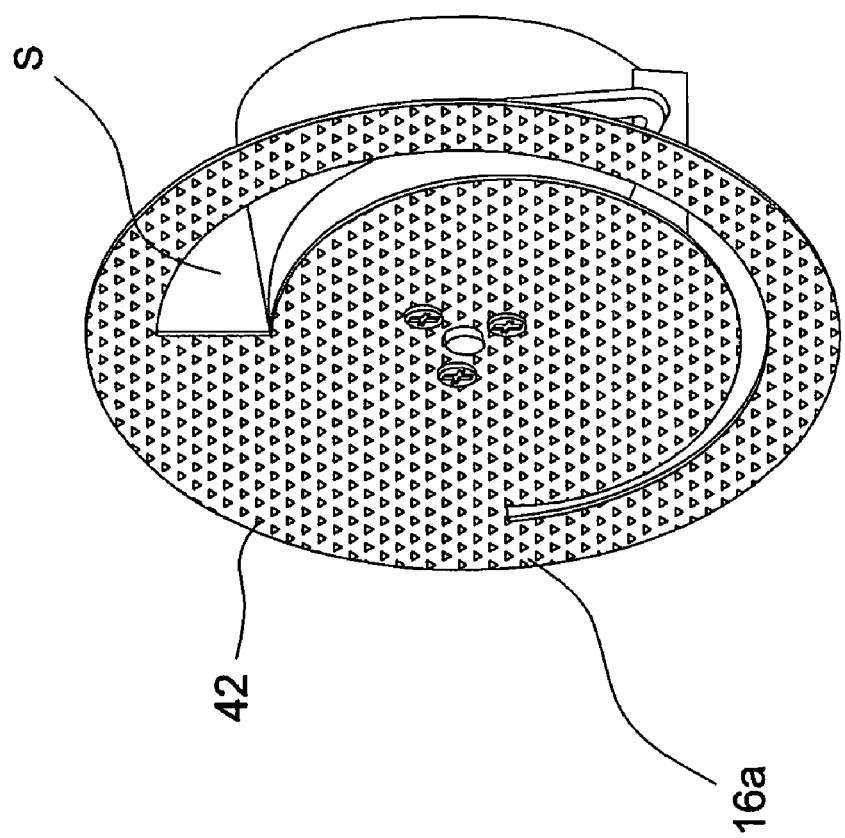
FIG. 6 shows an enlarged schematic diagram illustrating another aperture disk according to an embodiment of the invention.

Referring to FIG. 6, in one embodiment, multiple micromachining structures such as notches or bumps are formed on the light incident surface 16a of the aperture disk 16 to achieve similar effect of diffusing or scattering the incoming light beams I. Hence, the micromachining structures are also allowed to prevent the aperture disk 16 from being burnt out and avoid an excessive rise in lamp temperature. Hence, it is clearly seen from the above embodiments that the surface structure formed on the light incident surface 16a is not limited as long as it is capable of dispersing the incoming light beams I.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection optical system, comprising:
   a light source for emitting a light beam;
   a light homogenizer disposed on a propagation path of the light beam for homogenizing the light beam to form a homogenized beam;
   a light amount adjusting component disposed on the propagation path of the light beam and between the light source and the light homogenizer, the light amount adjusting component having a light incident surface upon which the light beam impinges, the light incident surface being provided with a surface structure for irregularly dispersing the light beam, wherein a slot is formed on the light amount adjusting component and a width of the slot changes along an extension direction of the slot to allow control of the amount of the light beam entering the light homogenizer when the light amount adjusting component moves or rotates;
   an imaging device disposed on a propagation path of the homogenized beam for modulating the homogenized beam to form an image beam; and
   a projection lens for receiving and then projecting the image beam.

2. The projection optical system as claimed in claim 1, wherein an overlap area between the slot and a light incident surface of the light homogenizer changes when the light amount adjusting component moves or rotates.

3. The projection optical system as claimed in claim 1, wherein the light amount adjusting component comprises an aperture disk.

4. The projection optical system as claimed in claim 1, wherein a shape of the slot is defined by an outer spiral and an inner spiral.

5. The projection optical system as claimed in claim 1, further comprising a color-generating element disposed on the propagation path of the light beam and between the light source and the light amount adjusting component.

6. The projection optical system as claimed in claim 5, wherein the color-generating element comprises a color wheel.

7. The projection optical system as claimed in claim 1, wherein the light homogenizer comprises a light integrator rod.

8. The projection optical system as claimed in claim 1, wherein the imaging device comprises a digital micro-mirror device or a reflection-type liquid crystal light valve.

9. The projection optical system as claimed in claim 1, further comprising a reflective mirror and a relay lens disposed the propagation path of the homogenized light beam for transmitting the homogenized light beam to the imaging device.

10. The projection optical system as claimed in claim 1, wherein the surface structure on the light incident surface of the light amount adjusting component comprises a sandblasted structure.

11. The projection optical system as claimed in claim 1, wherein the surface structure on the light incident surface comprises a plurality of micromachining structures.

12. The projection optical system as claimed in claim 11, wherein the micromachining structures comprise a plurality of notches or bumps.

13. The projection optical system as claimed in claim 1, wherein the width of the slot changes monotonically along the extension direction of the slot.

14. A light amount adjusting component adapted to a projection optical system having a light incident surface upon which a light beam impinges, the light incident surface being provided with a surface structure for irregularly dispersing the light beam, wherein a slot that permits the light beam to pass therethrough and enter a light-receiving element is formed on the light amount adjusting component, and a width of the slot changes along an extension direction of the slot to allow control of the amount of the light beam entering the light-receiving element when the light amount adjusting component moves or rotates.

15. The light amount adjusting component as claimed in claim 14, wherein the light amount adjusting component is an aperture disk.

16. The light amount adjusting component as claimed in claim 14, wherein a shape of the slot is defined by an outer spiral and an inner spiral.

17. The light amount adjusting component as claimed in claim 14, wherein the surface structure on the light incident surface of the light amount adjusting component comprises a sandblasted structure.

18. The light amount adjusting component as claimed in claim 14, wherein the surface structure on the light incident surface comprises a plurality of micromachining structures.

19. The light amount adjusting component as claimed in claim 18, wherein the micromachining structures comprise a plurality of notches or bumps.

20. The light amount adjusting component as claimed in claim 14, wherein the width of the slot changes monotonically along the extension direction of the slot.

* * * * *